United States Patent
Bernhagen

(10) Patent No.: US 7,210,356 B2
(45) Date of Patent: May 1, 2007

(54) PHYSICAL AGENTS DIRECTIVE DOSIMETER SYSTEM

(75) Inventor: James R. Bernhagen, Cary, NC (US)

(73) Assignee: Caterpillar Inc, Peoria, IL (US)

( * ) Notice: Subject to any disclaimer, the term of this patent is extended or adjusted under 35 U.S.C. 154(b) by 58 days.

(21) Appl. No.: 11/060,750

(22) Filed: Feb. 18, 2005

(65) Prior Publication Data
US 2006/0185434 A1    Aug. 24, 2006

(51) Int. Cl.
  *G01H 11/08* (2006.01)
(52) U.S. Cl. .......................... 73/661; 73/587
(58) Field of Classification Search ................ 73/579
  See application file for complete search history.

(56) References Cited

U.S. PATENT DOCUMENTS

| | | | |
|---|---|---|---|
| 4,475,401 A * | 10/1984 | Punia et al. ................ 73/658 |
| 4,736,629 A | 4/1988 | Cole | |
| 6,009,750 A | 1/2000 | Maurer et al. | |
| 6,242,701 B1 | 6/2001 | Breed et al. | |
| 6,271,760 B1 | 8/2001 | Watanabe et al. | |
| 6,490,929 B1 * | 12/2002 | Russell et al. ................ 73/660 |
| 6,490,930 B1 * | 12/2002 | Ohkubo et al. ................ 73/661 |
| 6,724,920 B1 | 4/2004 | Berenz et al. | |
| 6,834,436 B2 | 12/2004 | Townsend et al. | |
| 2001/0044685 A1 * | 11/2001 | Schubert ................ 701/50 |
| 2004/0239491 A1 | 12/2004 | Koutsky et al. | |
| 2005/0000998 A1 * | 1/2005 | Grazioli et al. ................ 227/2 |

FOREIGN PATENT DOCUMENTS

| FR | 2850312 A1 * | 7/2004 |
|---|---|---|
| JP | 55050122 A * | 4/1980 |
| JP | 03185317 A * | 8/1999 |

OTHER PUBLICATIONS

SafetyLine Institute (SLI) lecture, Human Vibration: Whole-Body Vibration, printed on Oct. 26, 2004.
SafetyLine Institute (SLI) lecture, Human Vibration: Assessment and Control of Whole-Body Vibration, printed on Oct. 26, 2004.
Directive 2002/44/EC of the European Parliament and of the Council of Jun. 25, 2002, Official Journal of the European Communities, 6.7.2002 L 177/13.
Silicon Designs Data sheet, Model 3320 G-LOGGER™ Acceleration Acquisition System, printed on Jan. 10, 2005.
The Global Source for Ergonomic Analysis, Design, Training & Information Resources, NexGen Ergonomics Press Release (Mar. 6, 2002), printed on Oct. 26, 2004, available at http://www.nexgenergo.com/.

* cited by examiner

*Primary Examiner*—Hezron Williams
*Assistant Examiner*—Rose M. Miller
(74) *Attorney, Agent, or Firm*—Finnegan, Henderson, Farabow, Garrett & Dunner

(57) ABSTRACT

A portable physical agents directive (PAD) dosimeter system may be provided. The portable PAD dosimeter system may include a housing and at least one accelerometer configured to generate electrical signals corresponding to a vibration exposure of an operator of a work machine. The portable PAD dosimeter system may also include a controller disposed in the housing configured to process the electrical signals and to determine whether the vibration exposure is above a predetermined threshold.

16 Claims, 8 Drawing Sheets

PHYSICAL AGENTS DIRECTIVE DOSIMETER SYSTEM

TECHNICAL FIELD

This disclosure relates generally to a work machine operational environment and, more particularly, to work machine physical agents directive (PAD) dosimeter technologies.

BACKGROUND

Built with advanced technologies, modern work machines can have large power-to-weight ratios and/or operate at high speed. High speed or large power-to-weight ratios may cause increased vibration of the work machines and/or vibration of various parts of the work machines. An operator of a modern work machine may be exposed to such vibration, which may be measured as hand-arm vibration and whole body vibration.

Whole body vibration, which may be transmitted to the entire human body, may have adverse health effects on the operator under a prolonged exposure. Whole body vibration measurement techniques have been recently developed to measure whole body vibration on a human body. For example, Vibration Analysis ToolSet, as described in *Comprehensive Human Vibration Analysis Solution*, measures human vibrations for whole body analysis by using standable components. Such analysis tools, however, often measure vibration exposure using extra components and, thus, may be impractical to be used to address work machine related vibration exposures.

Recognizing the risks of vibration exposure, the European Union has adopted a new directive, 2002/44/EC, "on the minimum health and safety requirements regarding the exposure of workers to the risks arising from physical agents (vibration)," the physical agents directive (PAD), to establish limits for whole body vibration. To comply with these limits, there is a need for PAD compliant measurement equipment to monitor work machine related vibration exposure.

Methods and systems consistent with certain features of the disclosed systems are directed to solving one or more of the problems set forth above.

SUMMARY OF THE INVENTION

One aspect of the present disclosure includes a portable PAD dosimeter system. The portable PAD dosimeter system may include a housing and at least one accelerometer configured to generate electrical signals corresponding to a vibration exposure of an operator of a work machine. The portable PAD dosimeter system may also include a controller disposed in the housing configured to process the electrical signals and to determine whether the vibration exposure is above a predetermined threshold.

Another aspect of the present disclosure includes a portable PAD dosimeter system. The portable PAD dosimeter may include a housing configured to be mountable on a part of a work machine and at least one accelerometer mounted inside the housing to generate electrical signals based on vibrations experienced by the housing, which correspond to a vibration exposure of an operator of the work machine. The portable PAD dosimeter may also include a controller contained in the housing and configured to process the electrical signals and to determine whether the vibration exposure is above a predetermined threshold.

Another aspect of the present disclosure includes a method for determining PAD compliance of a work machine. The method may include mounting a portable PAD dosimeter on a part of the work machine and using the portable PAD dosimeter to measure whole body vibration exposure of an operator of the work machine and to generate measurement data. The method may also include determining whether the whole body vibration exposure is above a PAD whole body vibration threshold.

Another aspect of the present disclosure includes a work machine. The work machine may include an engine to provide power to the work machine and a portable physical agents directive (PAD) dosimeter fitted to the work machine. The portable PAD dosimeter may include at least one sensor to generate electrical signals corresponding to a vibration exposure of an operator of the work machine and a controller configured to process the electrical signals and to determine whether the vibration exposure is above a PAD threshold. The portable PAD dosimeter may also include an on-board control system coupled with the portable PAD dosimeter via a data link to exchange information with the portable PAD dosimeter.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
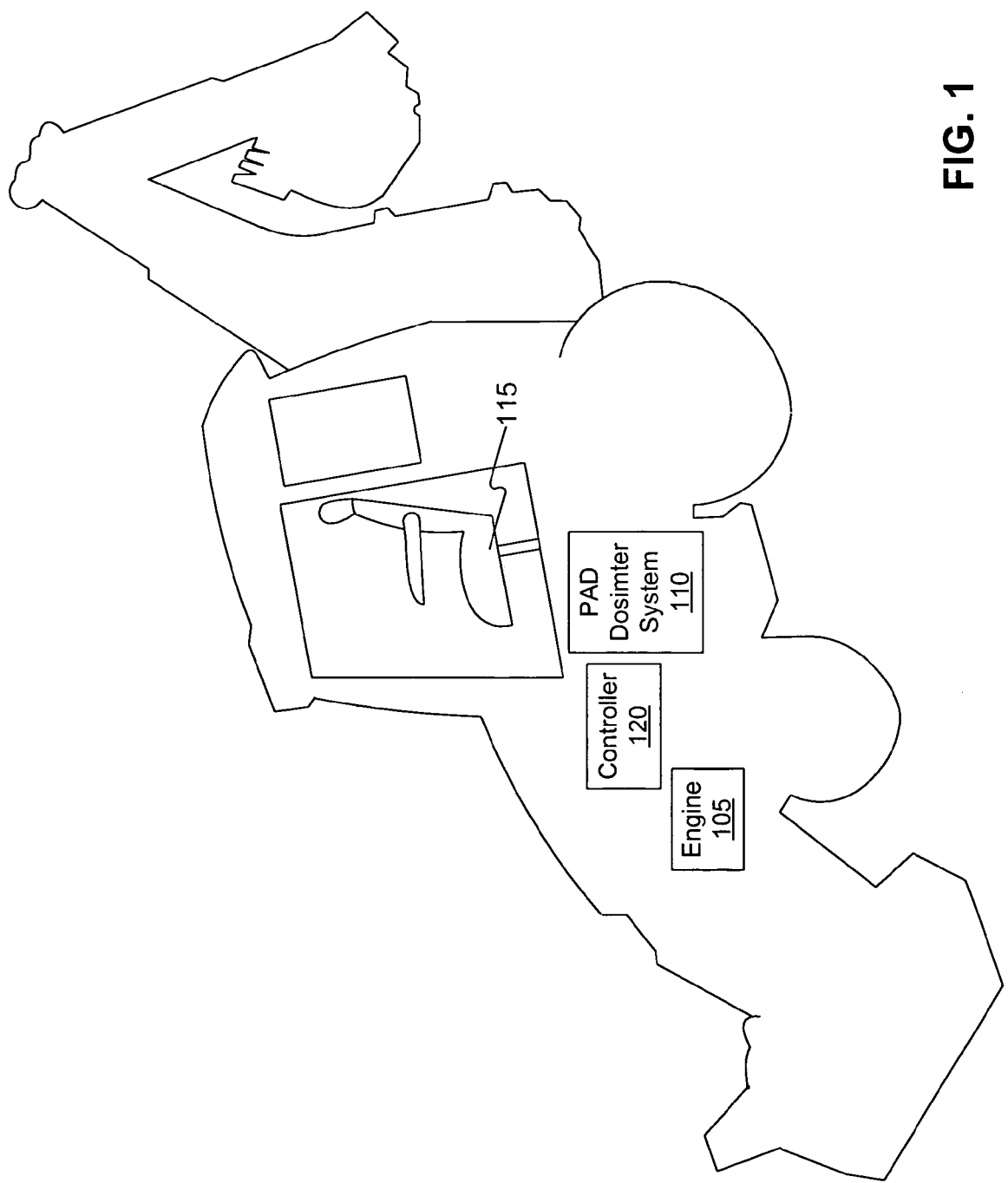
FIG. 1 is a pictorial illustration of an exemplary work machine that may incorporate certain disclosed embodiments.

FIG. 1 illustrates an exemplary work machine 100 in which features and principles consistent with certain disclosed embodiments may be incorporated. Work machine 100 may refer to any type of fixed or mobile machine that performs some type of operation associated with a particular industry, such as mining, construction, farming, transportation, etc. and operates between or within work environments (e.g., construction site, mine site, power plants, on-highway applications, etc.). Work machine 100 may also refer to any type of automobile or commercial vehicle. Non-limiting examples of mobile machines include on-highway vehicles, commercial machines, such as trucks, cranes, earth moving vehicles, mining vehicles, backhoes, material handling equipment, farming equipment, marine vessels, aircraft, and any type of movable machine that operates in a work environment, and/or cars, vans, trucks, and any type of automobile and commercial vehicle. Although, as shown in FIG. 1, work machine 100 is illustrated as a backhoe type work machine, it is contemplated that work machine 100 may be any type of work machine. Further, work machine 100 may be a conventionally powered, hybrid electric powered, and/or fuel cell powered work machine.

Work machine 100 may expose whole body vibration on its operators during operation. The European Union's physical agents directive (PAD) imposes two thresholds regarding whole body vibration. An action threshold refers to a whole body vibration exposure level above which an owner of a work machine is required to develop and implement an action plan. The action plan is for reducing vibration at levels above the action threshold. A limit threshold refers to a whole body vibration exposure level that cannot be exceeded. Both thresholds may be tracked as daily exposure values during a work shift over, for example, an eight-hour reference period.

As shown in FIG. 1, work machine 100 may include an engine 105, a PAD dosimeter system 110, an operator seat 115, and a controller 120. Engine 105 may be any appropriate type of engine, such as an internal combustion engine, and may provide power to work machine 100, controller 120, PAD dosimeter system 110, and/or other components (not shown) on work machine 100. Operator seat 115 may be provided for an operator or operators to sit during operation of work machine 100. Operator seat 115 may be any appropriate type of seat or bench used on work machines.

Figure 2A:
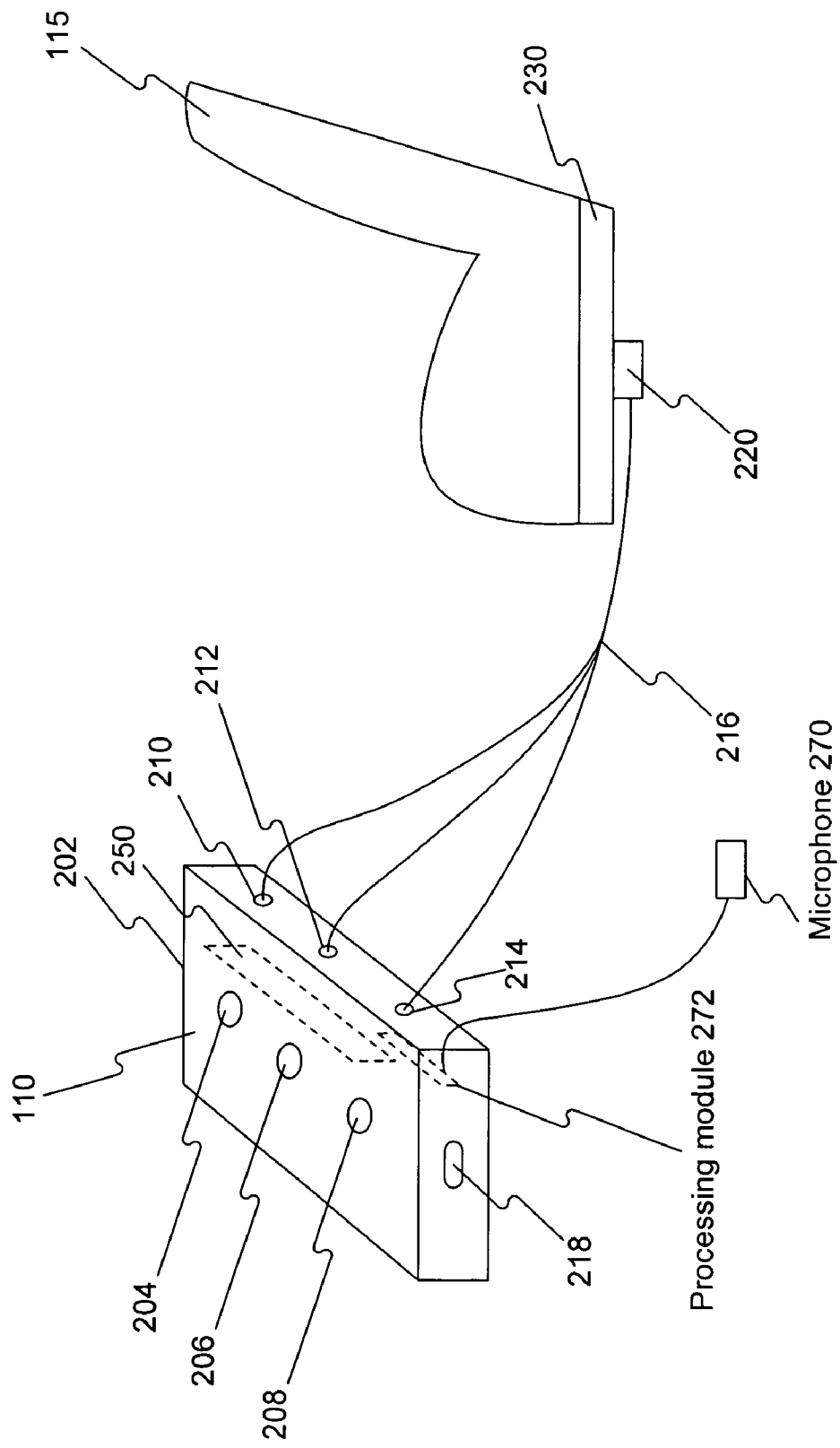
FIG. 2A illustrates an exemplary physical agents directive (PAD) dosimeter system consistent with certain disclosed embodiments.

PAD dosimeter system 110 may be provided to measure whole body vibration exposure levels on work machine 100. FIG. 2A shows exemplary details of PAD dosimeter system 110. As shown in FIG. 2A, PAD dosimeter system 110 may include a housing 202, a RESET button 204, a STOP button 206, and a START button 208. PAD dosimeter system 110 may also include an x-direction input 210, a y-direction input 212, a z-direction input 214, a cable 216, an I/O port 218, an accelerometer 220, and a PAD controller 250. Housing 202 may be made from any appropriate materials, such as metal, plastics, or other composite materials. Housing 202 may be of any appropriate shape suitable to support or mount components and/or electronic circuit boards. In one embodiment, housing 202 may be a rectangular box with a length of approximately four inches, a width of approximately 3 inches, and a height of approximately one and a half inches.

RESET button 204, STOP button 206, and START button 208 may be mounted on housing 202 to allow a user to manually operate PAD dosimeter system 110. START button 208 may be pressed to begin a data collection cycle, and STOP button 206 may be pressed to end the data collection cycle. RESET button, on the other hand, may clear previously collected data and/or restart PAD dosimeter system 110.

Accelerometer 220 may be any appropriate type of accelerometer that may detect acceleration or vibration on an x-axis, y-axis, and z-axis and may convert detected acceleration or vibration on the x-axis, y-axis, and z-axis into separate electrical signals. Alternatively, accelerometer 220 may include multiple accelerometers each detecting acceleration in a different direction (e.g., x-axis, y-axis, and/or z-axis, etc.). Although FIG. 2A shows that accelerometer 220 is mounted on a seat base 230 of operator seat 115, accelerometer 220 may be mounted on any appropriate parts of work machine 100 to measure corresponding whole body vibration exposures.

Cable 216 may be any appropriate type of cable to carry electrical signals corresponding to acceleration or vibration on an x-axis, y-axis, and z-axis. X-direction input 210, y-direction input 212, and z-direction input 214 may be coupled with accelerometer 220 to receive signals from accelerometer 220 corresponding to acceleration or vibration on the x-axis, y-axis, and z-axis, respectively.

Figure 2B:
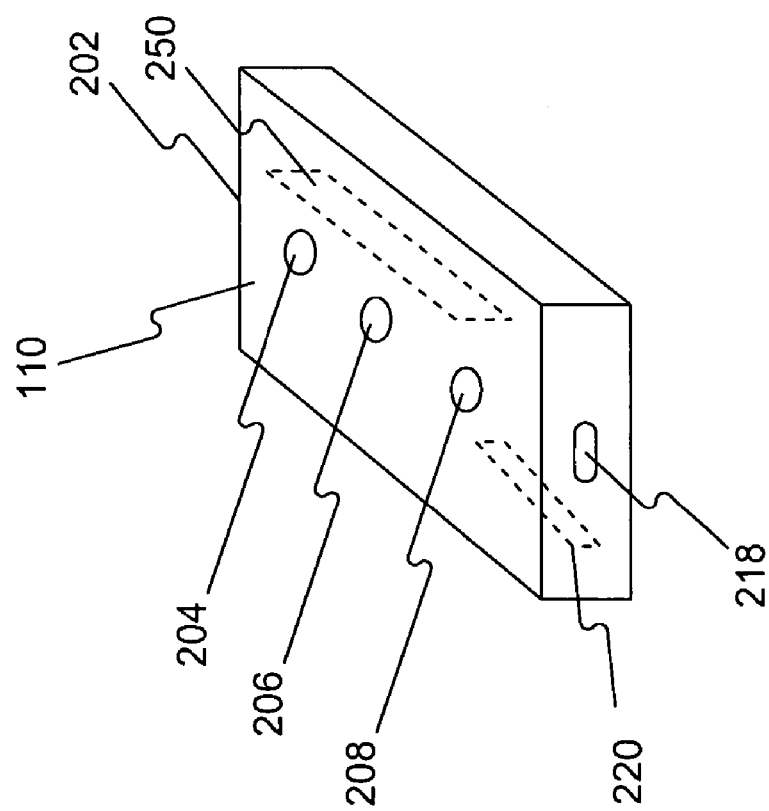
FIG. 2B illustrates another exemplary physical agents directive (PAD) dosimeter system consistent with certain disclosed embodiments.

In certain embodiments, as shown in FIG. 2B, accelerometer 220 may be mounted inside housing 202 such that PAD dosimeter system 110 may be a self-contained box. PAD dosimeter 110, specifically housing 202, may then be mounted or bolted on seat base 230 or on any appropriate parts of work machine 100. X-direction input 210, y-direction input 212, z-direction input 214, and cable 216 may be absent.

In both cases, whether accelerometer 220 is configured inside or outside housing 202, PAD dosimeter 110 may be configured as a portable device with appropriate mounting mechanisms. A user (e.g., an operator, an owner, or a service person of work machine 100) may then mount and operate PAD dosimeter 110 during operation of work machine 100. The operation result of PAD dosimeter 110 may be further displayed to the operator or outputted by I/O port 218.

I/O port 218 may be any appropriate type of connector to connect PAD dosimeter system 110 to external systems. In certain embodiments, I/O port 218 may be a universal serial bus connecting PAD dosimeter system 110 to an external personal computer (PC) (not shown) to record collected exposure data. In certain other embodiments, I/O port 218 may also be a data link connecting PAD dosimeter system 110 to controller 120. In certain other embodiments, I/O port 218 may be a data link connecting PAD dosimeter system 10 to operator display devices (not shown) to display measurement results. Although not shown in FIG. 2A, PAD dosimeter system 10 may also have a display device mounted on housing 202 to display measurement results as well.

Those skilled in the art will recognize that the components described in FIG. 2 are exemplary only and not intended to be limiting. Other components may also be added. For example, PAD dosimeter system 110 may include different sensors, such as microphones, to detect other environmental parameters (e.g., noise level) and may also include processing modules to process such environmental parameters.

Figure 3:
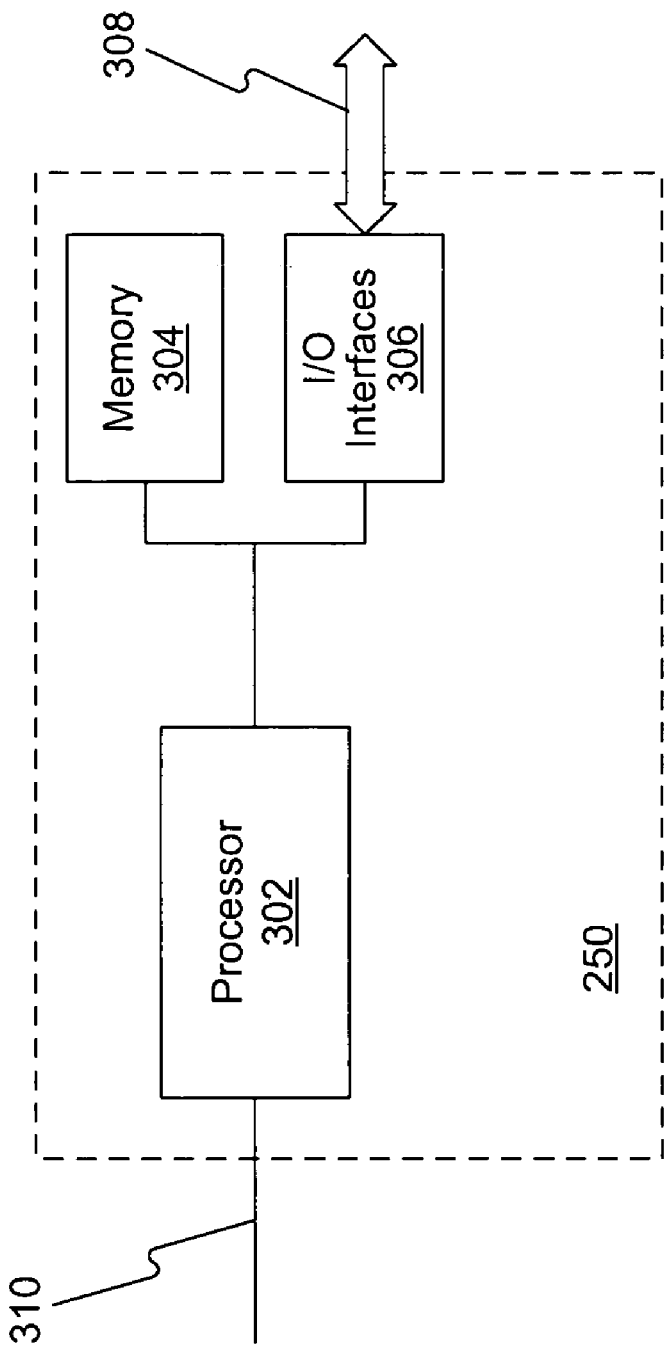
FIG. 3 illustrates an exemplary block diagram of a PAD controller of the PAD dosimeter system consistent with certain disclosed embodiments.

Further, PAD controller 250 may be any appropriate type of control system to provide signal processing, data collection, data analysis, data communication, and any other data and/or control functionalities. FIG. 3 shows an exemplary functional block diagram of PAD controller 250 consistent with disclosed embodiments.

As shown in FIG. 3, PAD controller 250 may include a processor 302, a memory module 304, I/O interfaces 306, I/O connections 308, and a bus 310. Those skilled in the art will recognize that other components may also be included in PAD controller 250.

Processor 302 may be any appropriate type of processor. For example, processor 302 may include one or more general purpose central processing units (CPUs). Processor 302 may also include digital signal processors (DSPs). Alternatively, processor 302 may include microcontrollers with on-board memory and network ports (e.g., controller area network ports, pulse width modulation ports, and I/O ports). In certain embodiments, processor 302 may communicate with controller 120 via bus 310 under predetermined protocols, such as J1939. Other communication protocols and bus types, however, may also be used.

Memory module 304 may include one or more memory devices, such as, but not limited to, a ROM, a flash memory, a dynamic RAM, and a static RAM. Memory module 304 may be configured to store information used by processor 302. Further, memory module 304 may be external or internal to processor 302. I/O interfaces 306 may be one or more input/output interface devices receiving data (e.g., control signals) from processor 302 and sending data (e.g., data signals corresponding to x-direction, y-direction, and z-direction acceleration, and control signals corresponding START, STOP, and RESET operations) to processor 302 via I/O connections 308. I/O interfaces 306 may also include connections to I/O port 218.

Figure 4:
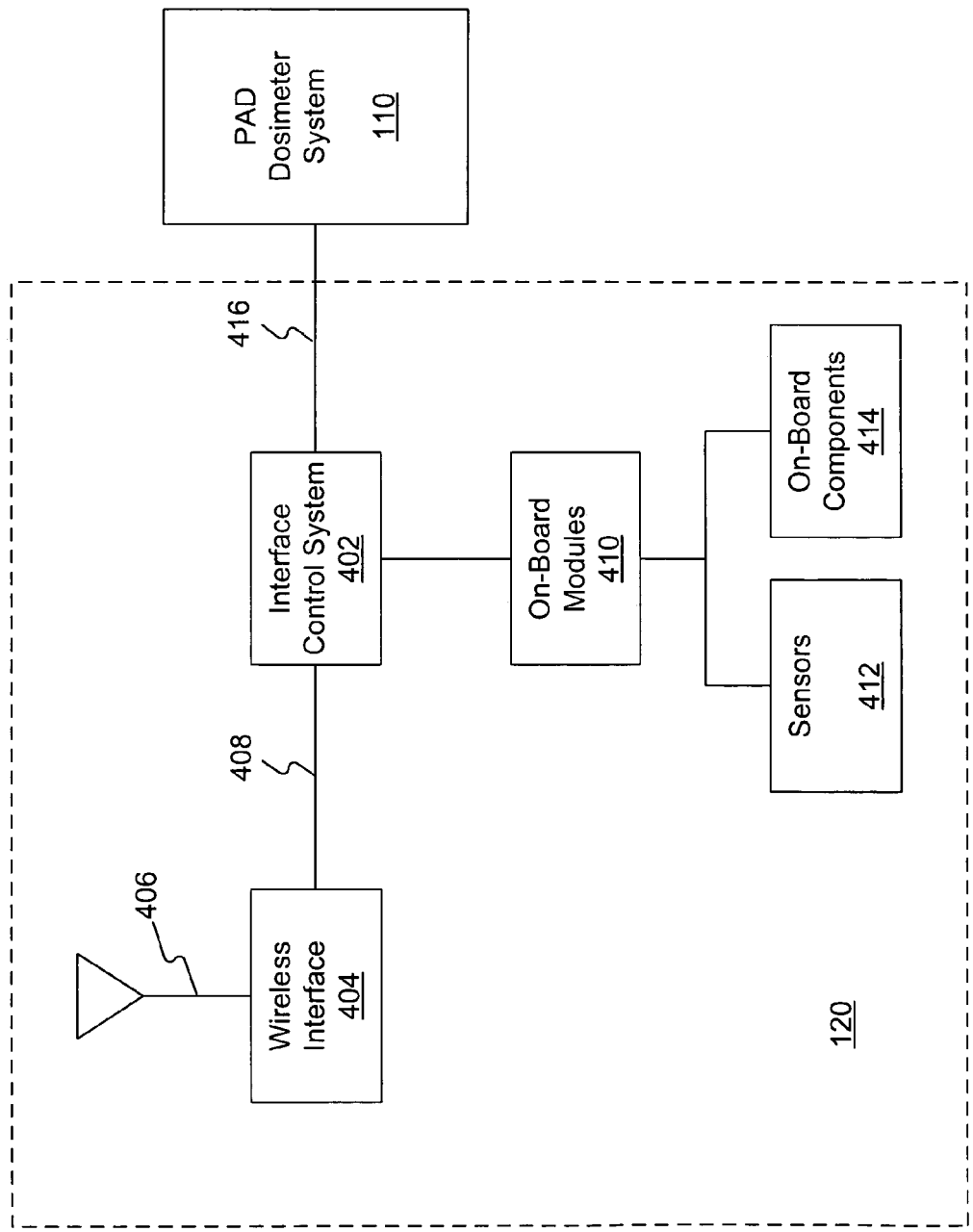
FIG. 4 illustrates a block diagram of an exemplary controller of the exemplary work machine.

Returning to FIG. 1, controller 120 may represent a system of one or more on-board modules, interface systems, data links, and other types of components that perform machine processes on work machine 100. Controller 120 may also include communication devices for communicating with different types of off-board systems (not shown). FIG. 4 illustrates a block diagram of controller 120 in connection with PAD dosimeter system 110 consistent with certain disclosed embodiments.

As shown in FIG. 4, controller 120 may include an interface control system 402, a wireless interface 404, an antenna 406, on-board modules 410, sensors 412, on-board components 414, and data links 408 and 416. On-board modules 410 may include one or more control modules or interface modules within work machine 100 that control sensors 412 and on-board components 414 or other types of sub-components. For example, on-board modules 410 may include an engine control module (ECM), a power system control module, a global positioning system (GPS) interface device, an attachment interface that connects one or more sub-components, and any other type of device that work machine 100 may use to facilitate and/or monitor operations of the machine during run time or non-run time conditions (e.g., machine engine running or not running, respectively).

Sensors 412 may include a variety of physical sensors for monitoring safety and operational conditions of work machine 100, such as hydrogen detection sensors, temperature sensors, voltage and current sensors, speed sensors, air or fuel flow sensors, position sensors including GPS position sensors, radar based sensors, laser based sensors, and any other type of sensor that work machine 100 may include to monitor operations of the machine. On-board components 414 may represent one or more components that receive data, control signals, commands, and/or information from on-board modules 410. On-board components 414 may represent different types of work machine components that perform various operations associated with the type of work machine 100. For example, on-board components 414 may include one or more engine components and one or more transmission type components.

Interface control system 402 may control sensors 412 and on-board components 414 through on-board modules 410. Interface control system 402 may include any appropriate type of on-board computer system for providing control functions to other modules within controller 120. Interface control system 402 may also provide interface functions between work machine 100 and one or more off-board systems (not shown). An off-board system may represent a system that is located remotely from work machine 120. For example, an off-board system may include Web browser software that requests and receives data from interface control system 402 and displays information to a user operating the off-board system. A user may also control certain aspects of work machine 100 using control commands sent from an off-board system to interface control system 402, which may then send control commands to targeted components or subsystems on work machine 100. Although FIG. 4 shows that interface control system 402 may communicate with an off-board system through wireless interface 404 and antenna 406, an off-board system may also connect to work machine 100 through wire or other wireless data links.

Wireless interface 404 may include one or more wireless communication modules configured to establish communication channels between an off-board system and controller 120. Wireless interface 404 may use any appropriate type of radio technology including mobile phone technology. Data link 408 may be provided for data and command exchanges between interface control system 402 and wireless interface 404.

Further, PAD dosimeter system 110 may be coupled with interface control system 402 via data link 416. Data link 416 may represent a proprietary or non-proprietary data link, such as a Society of Automotive Engineers (SAE) standard data link including controller area network (CAN), J1939, etc. Through data link 416, interface control system 402 may control PAD dosimeter system 110 according to pre-programmed procedures. Data link 416 between interface control system 402 and PAD dosimeter system 110 may include a permanent connection. Alternatively, data link 416 may include a non-permanent connection. For example, PAD dosimeter system 110 may be a portable module and may be mounted or placed on work machine 100 by any appropriate mechanisms, as previously explained. PAD dosimeter system 110 may then be connected to interface control system 402 via data link 416 when, for example, PAD dosimeter system 110 is aboard work machine 100.

In certain embodiments, interface control system 402 may also collect and process vibration data from PAD dosimeter system 110, and may further determine subsequent actions based on the collected and processed vibration data. Subsequent actions may include reducing engine power output, activating certain vibration reduction mechanisms, and/or adjusting operation environment of work machine 100.

Figure 5:
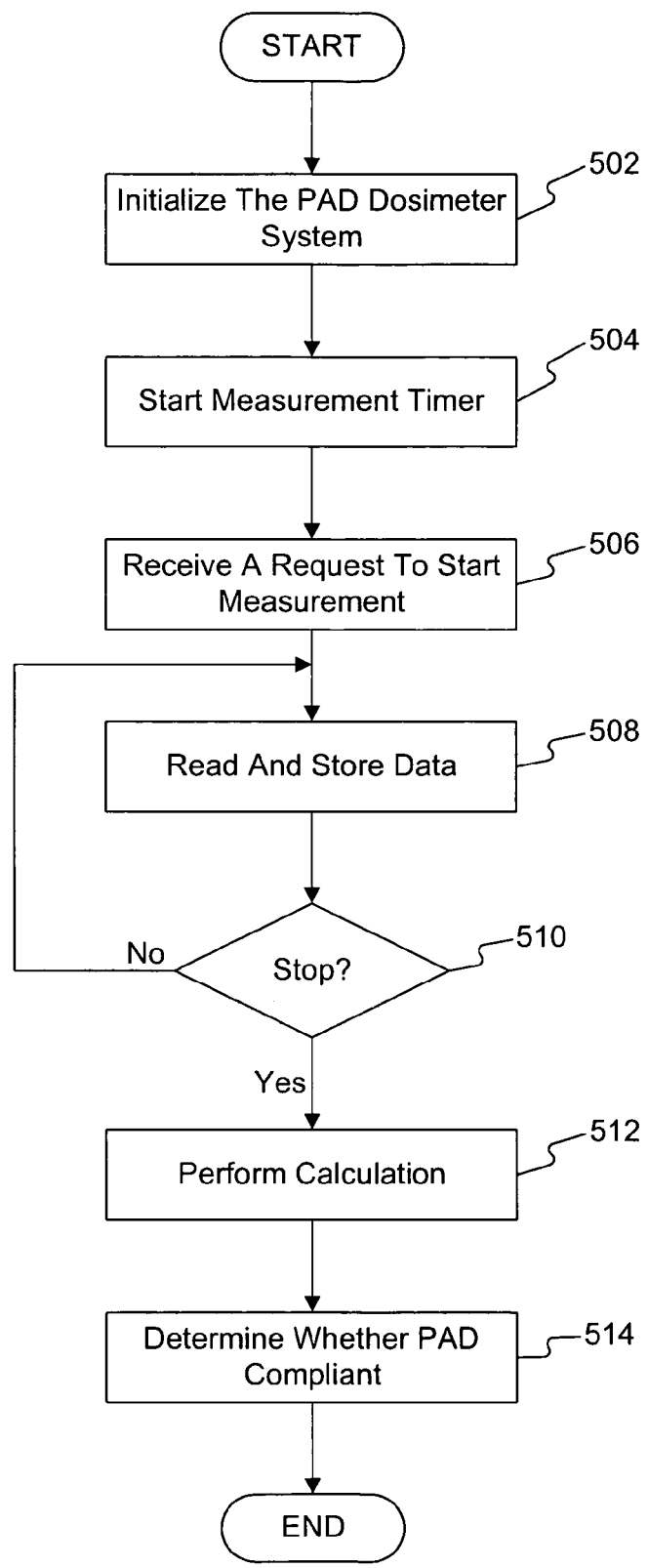
FIG. 5 illustrates a flowchart of a measuring process performed by the PAD controller consistent with certain disclosed embodiments.

In operation, processor 302 of PAD dosimeter system 110 may execute software programs stored in memory module 304 to perform a variety of operation processes based on a particular operation mode. As explained, PAD dosimeter system 110 may be operated as a portable device in a standalone mode, or coupled with interface control system 402 in an integrated mode. When operating in the standalone mode, PAD dosimeter system 110 may be brought on board work machine 100 by an operator. The operator may then mount PAD dosimeter system 110 on any appropriate parts of work machine 100, such as seat base 230. The operator may also mount accelerometer 220 if accelerometer 220 is not included inside housing 202. Further operator may cause PAD dosimeter system 110, specifically processor 302, to perform a measuring process under control of the operator. FIG. 5 shows an exemplary flowchart diagram of the measuring process that may be performed by processor 302.

As shown in FIG. 5, at the beginning of the measuring process, PAD dosimeter system 110 may be initialized (step 502). Processor 302 may initialize hardware devices in PAD dosimeter system 110 and may also set operational parameters for PAD dosimeter system 110. For example, processor 302 may set various timers and/or sampling rate for PAD measurement and analysis. After initialization, processor 302 may start a measurement timer (step 504). The measurement timer may be set as the time period of a work shift (e.g., eight hours). Processor 302 may then receive a request from an operator to start measurement (step 506). Processor 302 may receive the request when the operator presses START button 208. Alternatively, processor 302 may also receive the request by other means, such as a request from an external PC or other devices used by the operator. Optionally, operator may be asked to enter a key code or swipe a card in order to start PAD measurement. Once processor 302 receives the request to start PAD measurement (step 506), processor 302 may read and store the measurement data (step 508). Processor 302 may process electrical signals from x-direction input 210, y-direction input 212, and z-direction input 214, which may correspond to x-axis, y-axis, and z-axis vibrations detected by accelerometer 220. Processor 302 may convert the processed signals into digital data based on the sampling rate and store the digital measurement data in memory 304. The amount of data stored may vary according to the sampling rate.

Further, processor 302 may determine whether a request to stop the measurement is received (step 510). The request to stop may be generated by the operator when the operator presses STOP button 206 or, alternatively, by an external PC or other devices used by the operator. If processor 302 does not receive the request to stop (step 510; no), processor 302 may continue step 508 to read and store measurement data. On the other hand, if processor receives the request to stop (step 510; yes), the measuring process may go to step 512.

After stopping the measurement, or alternatively, when requested by the operator during machine operation, processor 302 may perform appropriate calculations to determine whole body vibration exposure using the stored data and algorithms stored in memory 304 (step 512). The algorithms may be any appropriate algorithms used to calculate whole body vibration exposure levels. Operational parameters, such as work shift length, may be chosen to be PAD specific. As a result of the calculations, processor 302 may obtain an averaged vibration exposure during a work shift by combining vibration exposures in x, y, and z directions.

In certain embodiments, processor 302 may perform intermediate calculations without receiving a request to stop. The intermediate calculation may be used to project an overall whole body exposure level before the end of the work shift.

Further, processor 302 may determine whether work machine 100 complies with PAD standard (step 514). To determine the PAD compliance, processor 302 may compare the calculated whole body vibration exposure level with both an action threshold and a limit threshold of PAD standard. If the vibration exposure is greater than either or both threshold, processor 302 may display such information on an optional display device (not shown) or store the information for later retrieval. When operating in standalone mode, PAD dosimeter system 110 may be taken with the operator after a work shift or any period of work machine operation. An external PC or other devices may interact with processor 302 to retrieve data from PAD dosimeter system 110. The retrieved data may be further analyzed by, for example, an owner or a work machine dealership, to determine machine conditions or whether further service may be needed.

Figure 6:
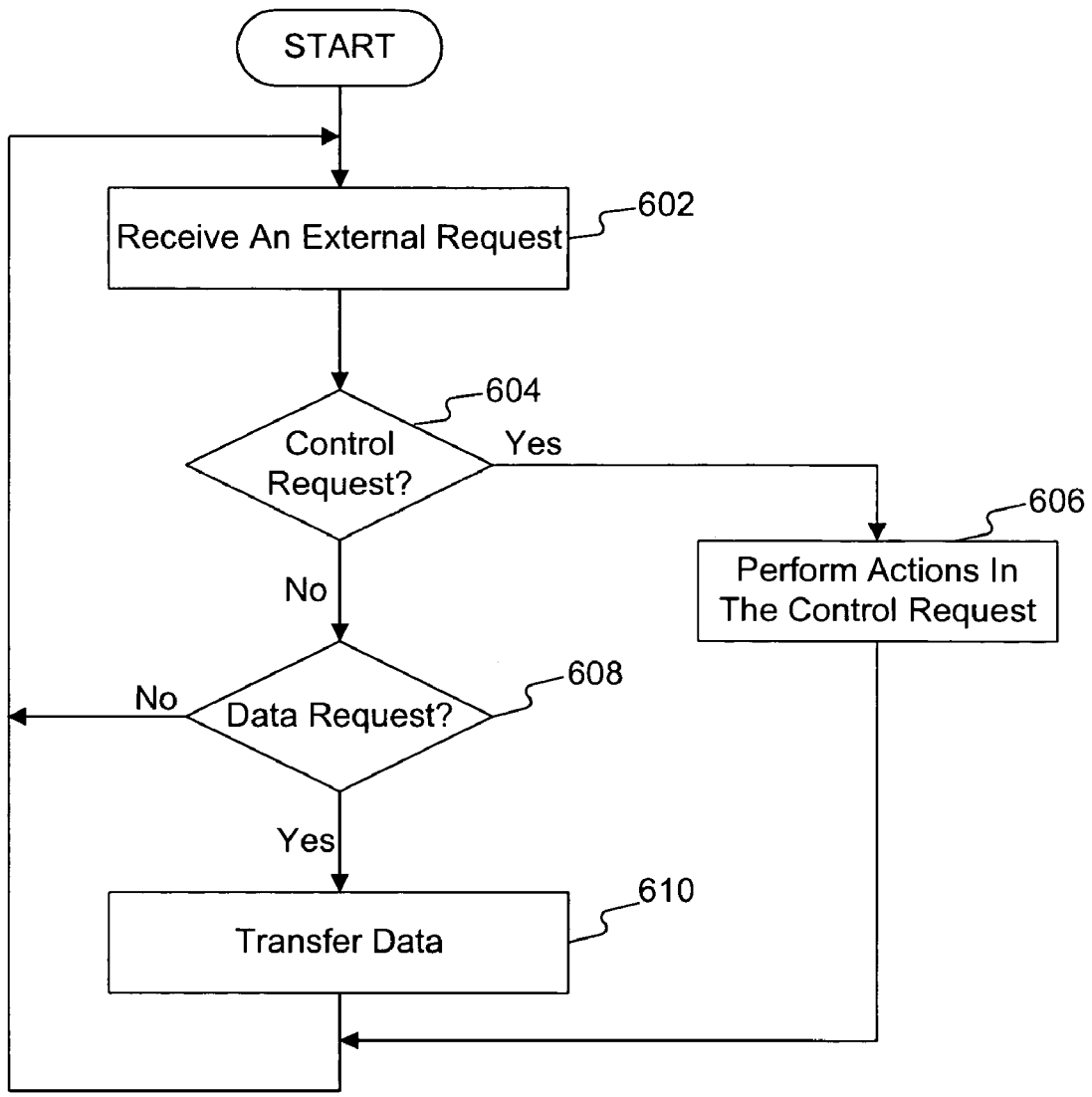
FIG. 6 illustrates a flowchart of an interaction process performed by the PAD controller consistent with certain disclosed embodiments.

FIG. 6 shows an interaction process performed by processor 302. As shown in FIG. 6, at the beginning of the operational process, processor 302 may receive an external request (step 602). The external request may be generated by any appropriate type of external device. For example, the external request may be issued by an external PC via I/O port 218. Alternatively, the external request may also be issued by interface control system 402 via data link 416.

After receiving the external request, processor 302 may determine whether the request is a control request (step 604). If the request is not a control request (step 604; no), processor 302 may further determine whether the request is a data request (step 608). On the other hand, if processor 302 determines that the request is a control request (step 604; yes), processor 302 may read the control request and perform certain control actions indicated in the control request (step 606). For example, processor 302 may reset PAD dosimeter system 110. Processor 302 may also start measurement, stop measurement, and/or perform calculations and analysis based on the control request. Processor 302 may also allow external devices take control over PAD dosimeter system 110. Once processor 302 completes control actions, processor 302 may continue to wait on further external requests in step 602.

On the other hand, if processor 302 determines that the external request is a data request (step 608; yes), processor 302 may read the request and transfer data available on PAD dosimeter system 110 (step 610). The data may be stored in memory 304 and may include measurement data received from x-direction input 210, y-direction input 212, and z-direction input 214. Alternatively, processor 302 may also receive data contained in the data request and may perform certain data-related operations on the received data. After completing data transferring or data receiving, processor 302 may continue to wait on further external requests in step 602. Similarly, processor 302 may also continue to wait on further requests in step 602 if processor 302 determines that the request is not a data request (step 608; no).

Figure 7:
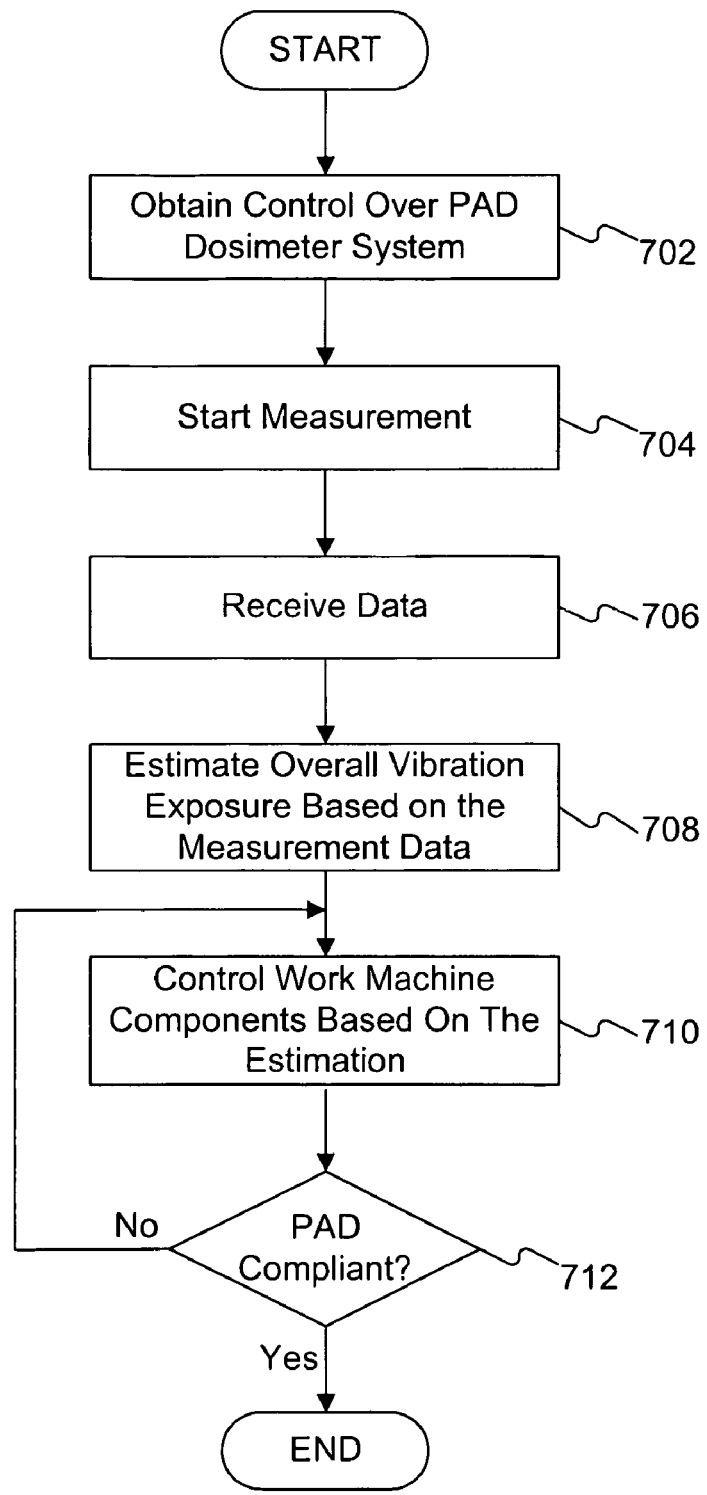
FIG. 7 illustrates a flowchart of a control process performed by the exemplary controller consistent with certain disclosed embodiments.

As explained, interface control system 402 may be coupled with PAD dosimeter system 110. FIG. 7 shows a control process that may be performed by interface control system 402. As shown in FIG. 7, at the beginning of the control process, interface control system 402 may obtain control over PAD dosimeter system 110, for example, processor 302 of PAD dosimeter system 110, via data link 416 (step 702). Once obtaining control, interface control system 402 may issue certain requests to PAD dosimeter system 110 regarding PAD measurements. For example, interface control system 402 may set a desired sampling rate or may choose certain algorithms provided by PAD dosimeter system 110. Interface control system 402 may control PAD dosimeter system 110 to start measuring whole body vibration exposure (step 704).

Further, interface control system 402 may request and receive measurement data from PAD dosimeter system 110 (step 706). Based on the received measurement data, interface control system 402 may perform certain calculations to estimate an overall vibration exposure level (step 708). For example, interface control system 402 may receive an averaged whole body vibration exposure level during a period of one hour. Interface control system 402 may then calculate a projected whole body vibration exposure level for a work shift of eight hours (e.g., eight times the averaged whole body vibration exposure level during a period of one hour). The calculation may be performed by interface control system periodically (e.g., every hour).

Based on the projected whole body vibration exposure for a work shift, interface control system 402 may control certain components of work machine 100, which may likely produce whole body vibration, to adjust whole body vibration exposure levels (step 710). For example, if interface control system 402 estimates an average vibration exposure value higher than a PAD threshold, interface control system 402 may control engine operations to reduce total output power to reduce vibration. Interface control system 402 may also display messages to an operator on certain display devices (not shown) on work machine 100. The operator may then take appropriate actions to reduce whole body vibration exposure, such as reducing load or engine speed.

On the other hand, if the estimated whole body vibration exposure is within PAD standard limitations, interface control system 402 may decide not to perform adjustments. Interface control system 402 may complete the control process. On the other hand, after making the adjustments, interface control system 402 may again determine whether a projected whole body vibration exposure level is within the PAD standard limitations (step 712). If interface control system 402 determines that the projected vibration exposure level is within the PAD limitations (step 712; yes), interface control system 402 may complete the control process. If interface control system 402 determines that the projected vibration exposure level is still greater than the PAD standard limitations (step 712; no), interface control system 402 may continue to perform adjustments in step 710. After a certain number of such adjustments, however, interface control system 402 may decide to stop further adjustments and may also indicate such failure to the operator.

Optionally, although not shown in FIG. 7, interface control system 402 may transfer received data to an off-board system via wireless interface 404. The off-board system may be equipped with more sophisticated software programs to further analyze the received data. The analysis results may then be provided to work machine dealers, operators, owners, and/or other parties of interest. Further, the off-board system may be configured to perform certain control processes via interface control system 402 to direct control PAD dosimeter and/or work machine components. For example, the off-board system 402 may include computer servers of a work machine dealer service network. The computer servers may automatically collect PAD compliance information of a work machine from PAD dosimeter 110 directly or from interface control system 402. The collected PAD compliance information may then be used to provide service to the work machine or present the PAD compliance information to an owner of the work machine.

INDUSTRIAL APPLICABILITY

The disclosed methods and systems may be incorporated in work machines where it may be desirable to determine PAD compliance of the work machines, including both PAD action threshold and PAD limit threshold. The proposed PAD dosimeter system and method may use algorithms related to the PAD standard to provide a compact, portable, accurate, and low cost solution for an operator or owner of a work machine to determine whole body vibration PAD compliance corresponding to a particular type of work machine operation. By directly displaying PAD compliance to the operator, complex data analysis and costly software programs may be avoided. Additionally, the proposed methods and systems may be used to measure other environmental parameters such as noise.

The proposed PAD dosimeter system may also allow work machine owners or dealers to transfer PAD measurement data to their own computers to record the PAD measurement data. Work machine dealers may further analyze the PAD measurement data to provide meaningful information services to work machine owners or operators. Further, the proposed systems and methods may be used in combination with other on-board control systems of work machines to provide real-time PAD compliance data.

The proposed PAD dosimeter system may be mounted on a work machine as a self contained or semi-self contained unit to provide desired portability. The proposed PAD dosimeter system may also enable PAD compliance measurement on work machines not already equipped with a PAD dosimeter system (e.g., retrofit).

Those skilled in the art will recognize that the systems and processes described above are exemplary only and not intended to be limiting. Other systems may be used, other processes may be created, steps in the described processes may be removed or modified, the order of these steps may be changed, and/or other operation steps may be added.

The invention claimed is:

1. A portable physical agents directive (PAD) dosimeter system, comprising:
   a housing configured to be selectively mounted on a part of a machine;
   at least one accelerometer mounted inside the housing to generate electrical signals based on vibrations experienced by the housing, which correspond to a vibration exposure of an operator of the machine; and
   a controller contained in the housing and configured to process the electrical signals and to determine whether the vibration exposure is above a predetermined threshold.

2. The portable PAD dosimeter system according to claim 1, wherein the predetermined threshold is either a PAD action threshold or a PAD limit threshold.

3. The portable PAD dosimeter system according to claim 1, further including:
   an I/O port configured to allow the controller to exchange data with an external microprocessor based device.

4. The portable PAD dosimeter system according to claim 1, further including:
   a display device configured to indicate whether the vibration exposure is above either a PAD action threshold or a PAD limit threshold.

5. The portable PAD dosimeter system according to claim 1, wherein the housing is mounted on a base of a seat for an operator of the machine.

6. A machine, comprising:
   an engine configured to provide power to the machine;
   a portable physical agents directive (PAD) dosimeter fitted to the machine, the portable PAD dosimeter including:
      at least one sensor to generate electrical signals corresponding to a vibration exposure of an operator of the machine, and
      a controller configured to process the electrical signals and to determine whether the vibration exposure is above a PAD threshold; and
   a separate on-board control system coupled with the portable PAD dosimeter via a data link to exchange information with the portable PAD dosimeter.

7. The machine according to claim 6, wherein the portable PAD dosimeter further includes:
   a display device to indicate to the operator whether the vibration exposure is above a PAD threshold.

8. The machine according to claim 6, wherein the at least one sensor includes at least one accelerometer.

9. The machine according to claim 6, wherein the portable PAD dosimeter further includes at least one microphone and at least one processing module to determine a noise level of the machine based on the microphone.

10. The machine according to claim 6, wherein the on-board control system further includes a wireless communication module for establishing a communication path to transfer PAD compliance information from the portable PAD dosimeter to a location remote from the machine.

11. The machine according to claim 6, wherein the on-board control system is configured to control vibration producing components of the machine to reduce whole body vibration of the machine.

12. The machine according to claim 11, wherein the on board control system is configured to control vibration by reducing an operating speed of the engine.

13. A dealer service network having one or more machines according to claim 6, the dealer service network further including:
one or more servers configured to automatically collect PAD compliance information from either the on-board control system or the portable PAD dosimeter.

14. The machine according to claim 6, wherein the on-board control system is further configured to:
initialize the portable PAD dosimeter system;
start a measurement timer to set a work shift period for the portable PAD dosimeter system;
receive a request from the operator to measure the vibration exposure of the operator; and
read measurement data from the portable PAD dosimeter.

15. The machine according to claim 14, the on-board control system is further configured to:
perform calculation based on the measurement data; and
determine whether the vibration exposure is above one of a PAD action threshold and a PAD limit threshold.

16. The machine according to claim 6, wherein the controller is further configured to:
receive a request from the on-board control system;
determine whether the request is a control request or a data request;
perform, if the request is a control request, an action corresponding to the control request; and
transfer data to the on-board control system if the request is a data request.

* * * * *

UNITED STATES PATENT AND TRADEMARK OFFICE
CERTIFICATE OF CORRECTION

PATENT NO. : 7,210,356 B2  Page 1 of 1
APPLICATION NO. : 11/060750
DATED : May 1, 2007
INVENTOR(S) : Bernhagen It is certified that error appears in the above-identified patent and that said Letters Patent is hereby corrected as shown below:

On the Title Page, item (56), under "FOREIGN PATENT DOCUMENTS", in Column 2, Line 2, delete "JP 03185317 A  8/1999" and insert -- JP 03185317 A  8/1991 --, therefor.

In Column 4, Line 36, delete "10" and insert -- 110 --, therefor.

In Column 4, Line 39, delete "10" and insert -- 110 --, therefor.

Signed and Sealed this

Eighth Day of July, 2008

JON W. DUDAS
*Director of the United States Patent and Trademark Office*